(12) United States Patent
Lee

(10) Patent No.: US 9,069,524 B2
(45) Date of Patent: Jun. 30, 2015

(54) DISPLAY FOR A LAPTOP

(71) Applicant: WISTRON CORP., New Taipei (TW)

(72) Inventor: Wen-Cong Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 64 days.

(21) Appl. No.: 14/045,736

(22) Filed: Oct. 3, 2013

(65) Prior Publication Data

US 2014/0368978 A1 Dec. 18, 2014

(30) Foreign Application Priority Data

Jun. 17, 2013 (CN) .......................... 2013 1 0239980

(51) Int. Cl.
*G02F 1/1333* (2006.01)
*G06F 1/16* (2006.01)

(52) U.S. Cl.
CPC .................................. *G06F 1/1601* (2013.01)

(58) Field of Classification Search
CPC . H04N 5/2254; H04N 5/2253; H04N 5/2257; G02B 6/0081; G02B 6/36; G02B 6/3825; G02B 6/3893; G02B 6/3895; G02B 6/3898; G02B 6/0065; A61F 2002/30451; A61F 2220/0025; A61F 2220/0041; A61F 2220/0058; A61F 2250/0018; B29C 65/04; B29C 65/1432; B29C 65/7844; B29C 66/532; B29C 66/1142; B29C 66/73921; G09F 17/00; G09F 9/301; H01L 27/14618; H01L 27/14625; B60R 16/0215; B65D 2313/02; B65D 33/24; G02F 1/133308; G02F 1/133606; G02F 1/13439; G02F 2001/133322; G02F 2001/133317; G02F 2202/025; H05K 5/0221; B23K 20/12; B23K 20/1235; B23K 20/1245; B23K 9/205; B65B 13/322
USPC ........... 248/218.4, 219.1, 245, 250; 156/73.5, 156/345.52, 499, 580; 29/700; 348/373; 349/58; 118/500, 725; 312/223.1; 318/466; 428/347
See application file for complete search history.

(56) References Cited

U.S. PATENT DOCUMENTS 8,885,116 B2 * 11/2014 Bayne et al. .................... 349/58
2009/0105632 A1 * 4/2009 Padmanabhan et al. ........ 604/20
2014/0139782 A1 * 5/2014 Wang et al. ..................... 349/58

* cited by examiner

*Primary Examiner* — Thoi Duong

(57) ABSTRACT

A display is disclosed. A cover body includes at least one thermal welding pin. A liquid-crystal display panel is disposed on the cover body and includes at least one fastening through hole. The thermal welding pin of the cover body is fit in the fastening through hole of the liquid-crystal display panel and is welded to the liquid-crystal display panel using a thermal welding method.

8 Claims, 6 Drawing Sheets

DISPLAY FOR A LAPTOP

CROSS REFERENCE TO RELATED APPLICATIONS

This Application claims priority of China Patent Application No. 201310239980.6, filed on Jun. 17, 2013, the entirety of which is incorporated by reference herein.

BACKGROUND OF THE INVENTION

1. Field of the Invention

The invention relates to a display, and more particularly to a display for a laptop.

2. Description of the Related Art

Regarding assembly of a display for a laptop, an LCD panel is fastened to a cover body by multiple bolts. In addition to consuming a lot of manpower and labor hours, fastening the LCD panel to the cover body by the multiple bolts may result in uneven combination strength between the LCD panel and the cover body.

Hence, there is a need for a display, of a laptop, providing reduced labor hours of assembly and enhanced uniformity of combination strength.

BRIEF SUMMARY OF THE INVENTION

A detailed description is given in the following embodiments with reference to the accompanying drawings.

An exemplary embodiment of the invention provides a display comprising a cover body and a liquid-crystal display panel. The cover body comprises at least one thermal welding pin. The liquid-crystal display panel is disposed on the cover body and comprises at least one fastening through hole. The thermal welding pin of the cover body is fit in the fastening through hole of the liquid-crystal display panel and is welded to the liquid-crystal display panel using a thermal welding method.

The liquid-crystal display panel further comprises at least one extended fastening portion on which the fastening through hole is formed.

The extended fastening portion comprises metal.

The cover body further comprises at least one hook engaged with the liquid-crystal display panel.

The hook comprises at least three reinforcement ribs extending from a top surface of the hook to a bottom surface thereof.

The hook further comprises a curved abutting surface abutting the liquid-crystal display panel.

The curved abutting surface of the hook is located on one side with the top and bottom surfaces and the reinforcement ribs are located on the other side with the top and bottom surfaces.

The thermal welding pin is integrally formed with the cover body.

The hook is integrally formed with the cover body.

The thermal welding pin is provided with a cross shape.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
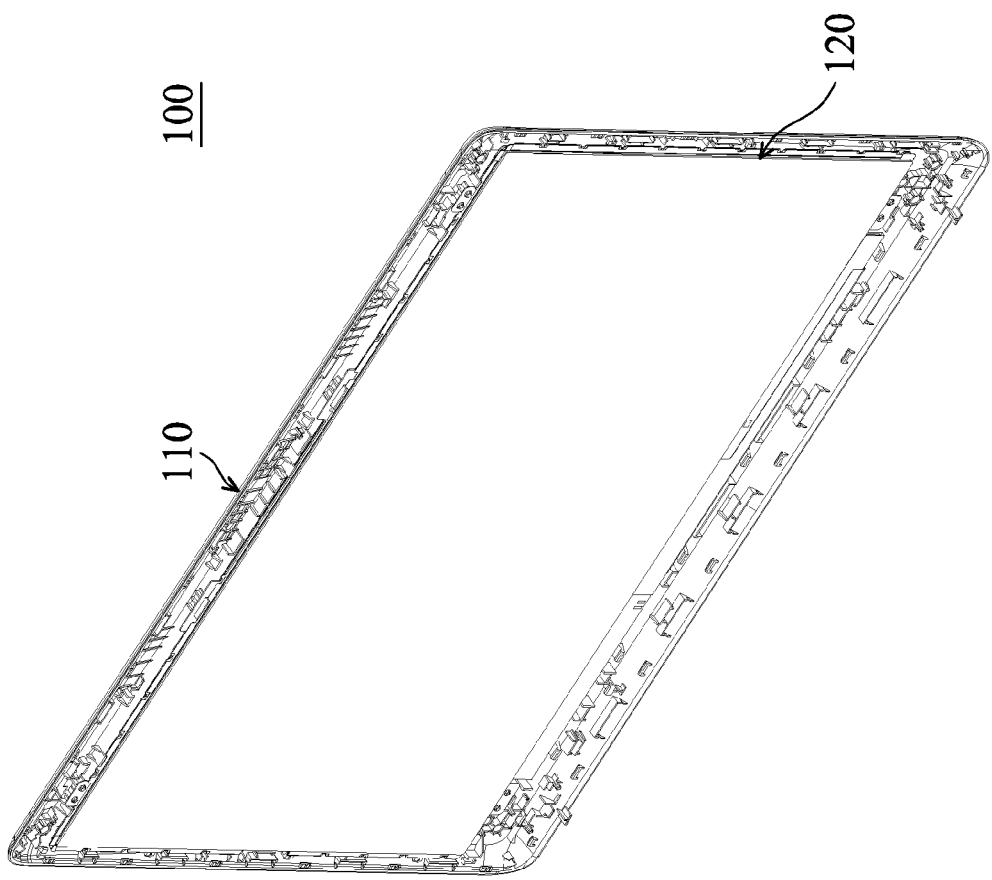
FIG. 1 is a schematic perspective view of a display of the invention.
Figure 3:
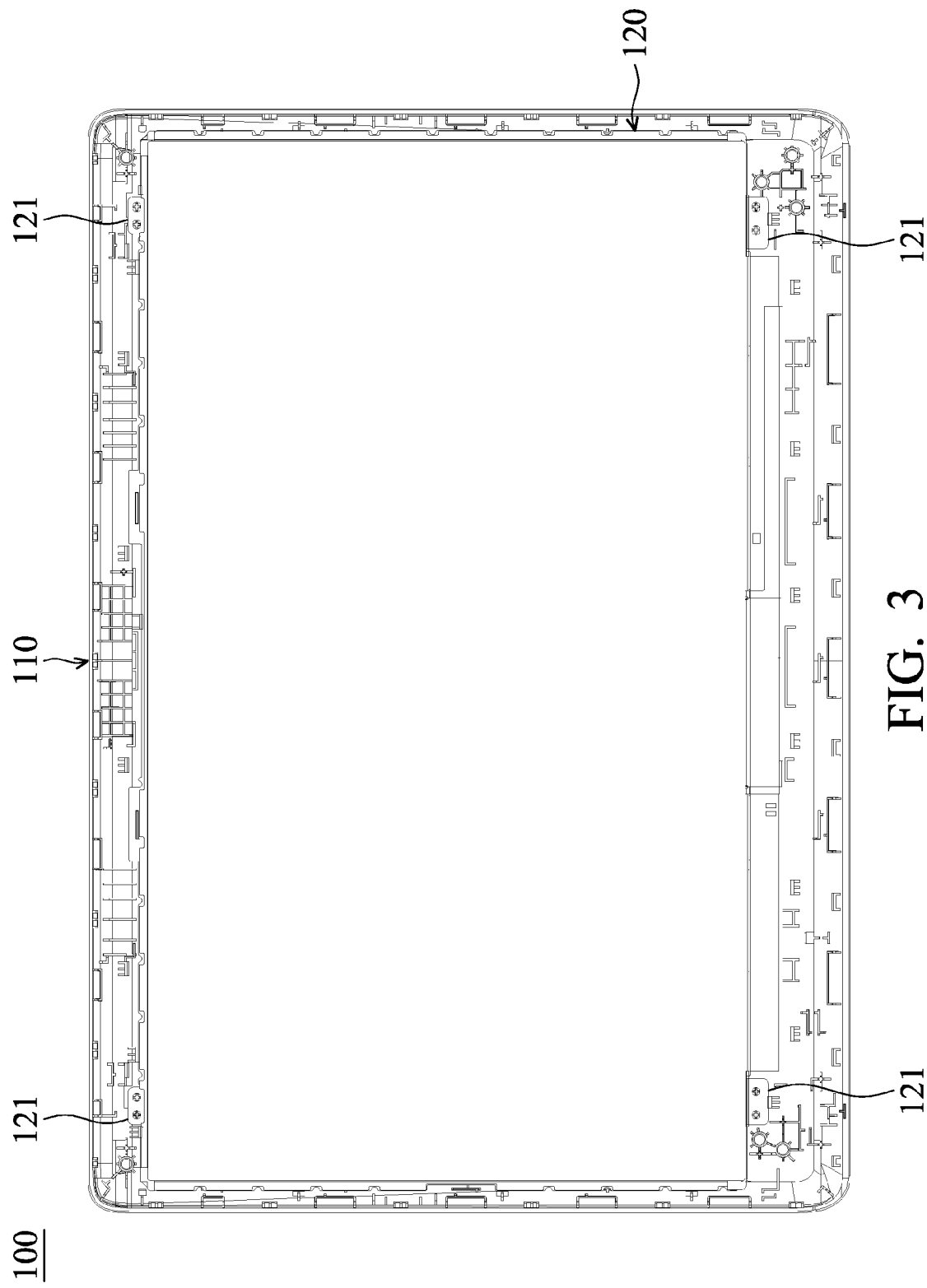
FIG. 3 is a schematic plane view of the display of the invention.

Referring to FIG. 1 and FIG. 3, a display 100 is arranged in a laptop and comprises a cover body 110 and a liquid-crystal display (LCD) panel 120.

Figure 2:
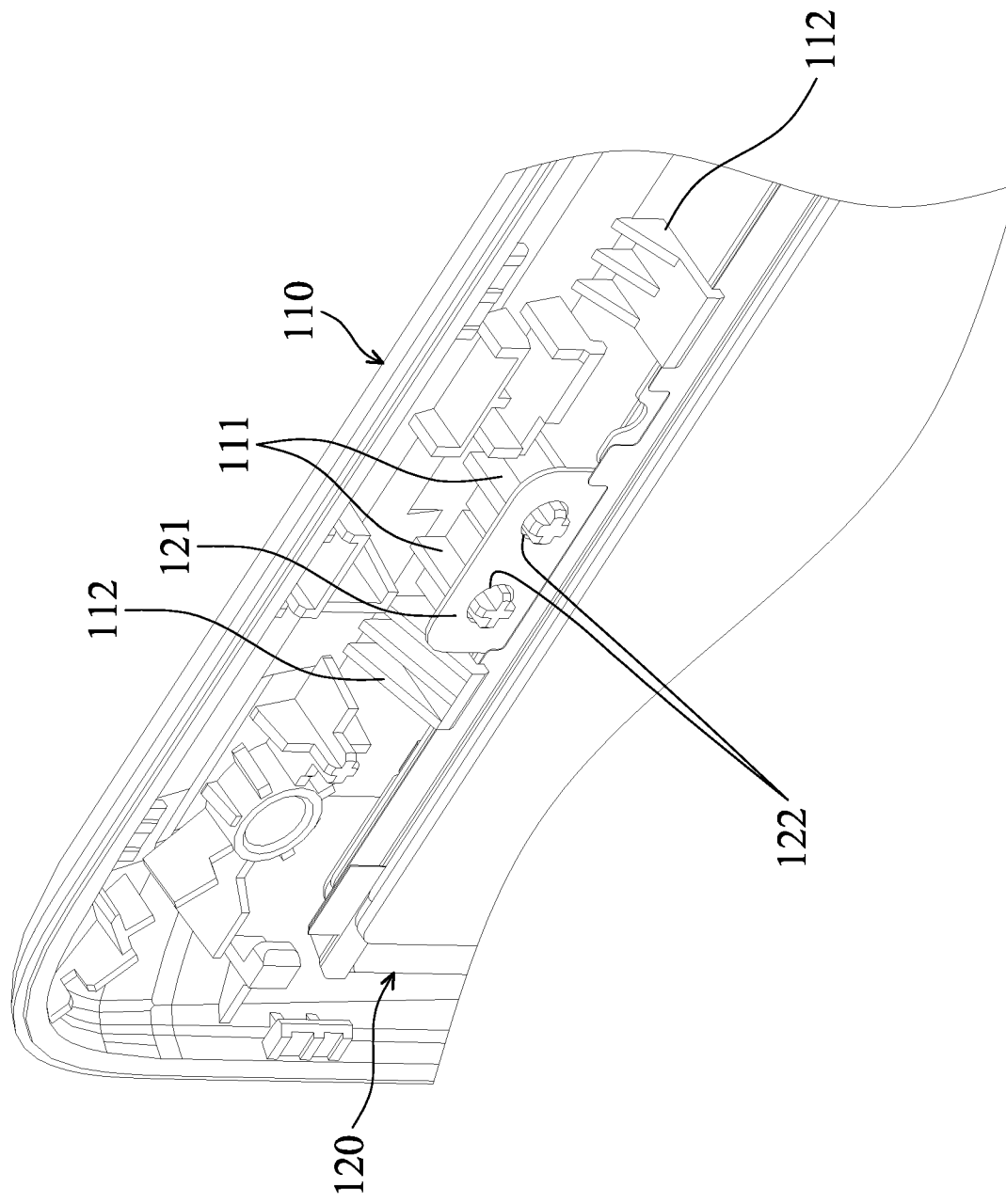
FIG. 2 is a partial enlarged view of FIG. 1.
Figure 4:
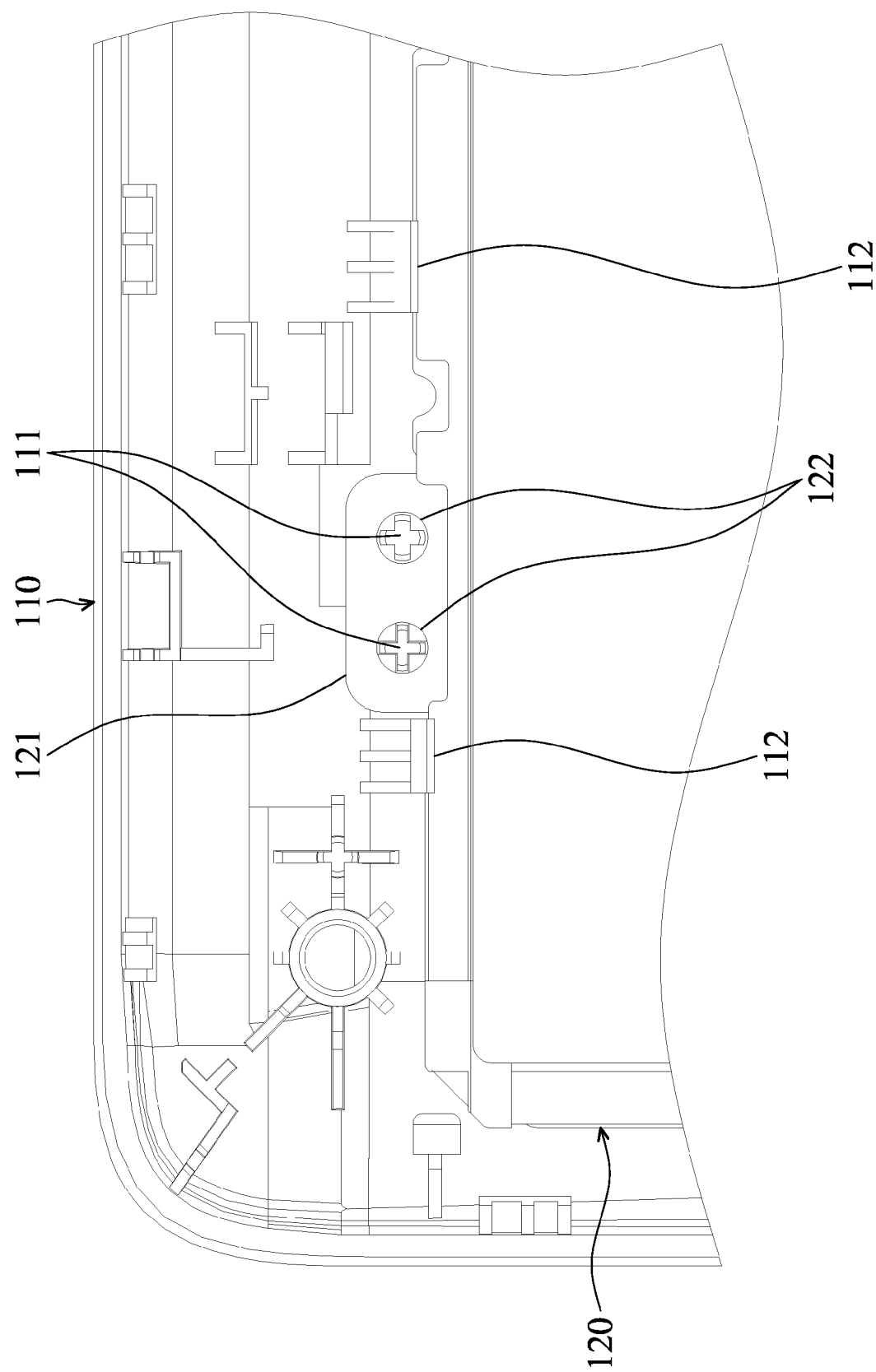
FIG. 4 is a partial enlarged view of FIG. 3.

As shown in FIG. 2 and FIG. 4, the cover body 110 comprises a plurality of thermal welding pins 111 and a plurality of hooks 112. Here, the thermal welding pins 111 and hooks 112 are substantially disposed at four corners of the cover body 110 and are not limited thereto. Namely, the thermal welding pins 111 and hooks 112 may be disposed in other positions on the cover body 110 according to practical application requirements. Additionally, in this embodiment, the thermal welding pins 111 and hooks 112 may be integrally formed with the cover body 110 by injection molding.

The LCD panel 120 is disposed on the cover body 110 and comprises a plurality of extended fastening portions 121 and a plurality of fastening through holes 122 corresponding to the thermal welding pins 111. In this embodiment, the extended fastening portions 121 may be composed of metal and the fastening through holes 122 are formed on the extended fastening portions 121.

The following description is directed to assembly of the display 100.

Figure 5:
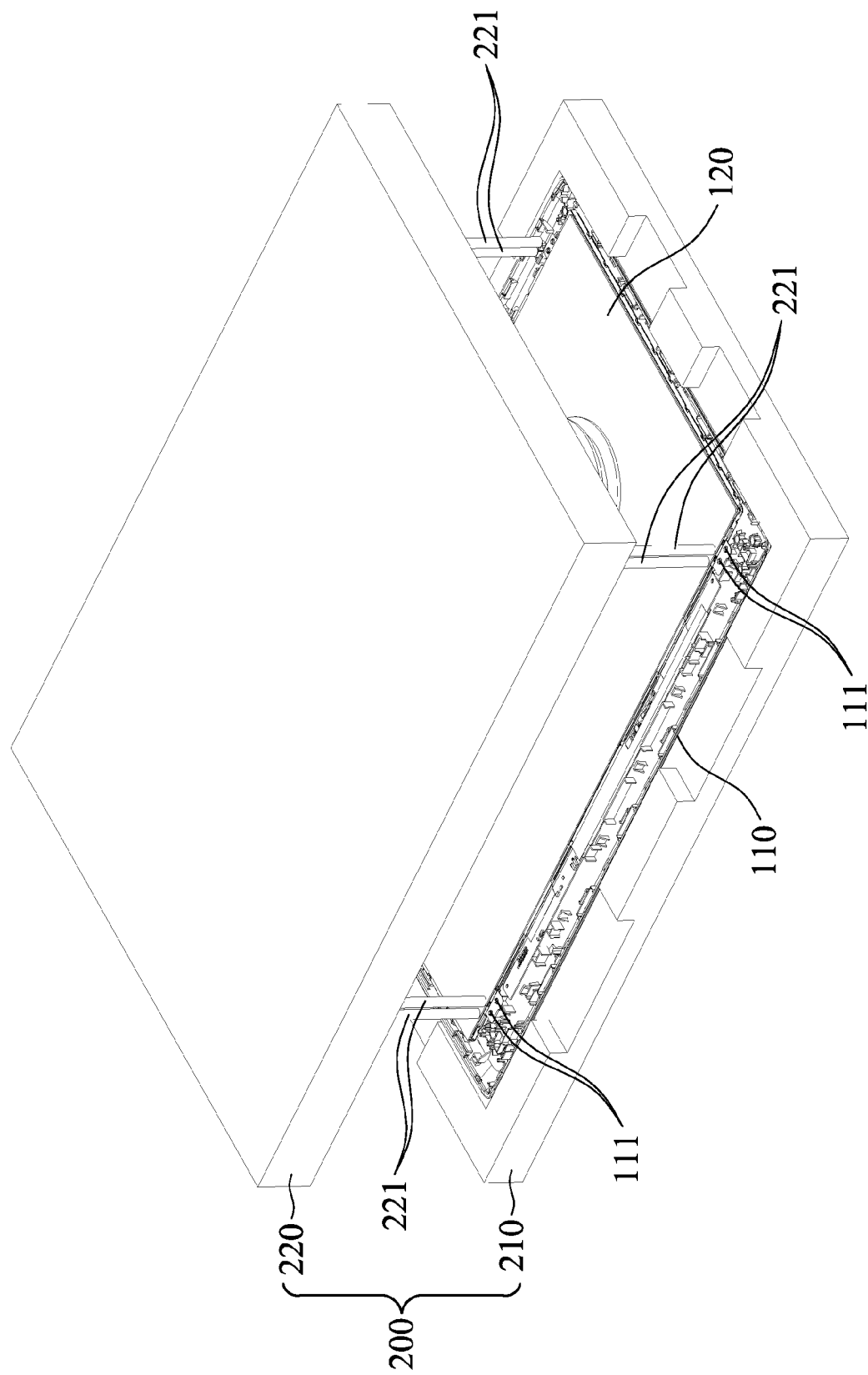
FIG. 5 is a schematic perspective view showing the present display manufactured by a thermal welding press fixture.

The LCD panel 120 is first disposed on the cover body 110 and the thermal welding pins 111 of the cover body 110 are respectively aligned with the fastening through holes 122 of the LCD panel 120. Next, the LCD panel 120 is pressed toward the cover body 110, respectively fitting the thermal welding pins 111 of the cover body 110 in the fastening through holes 122 of the LCD panel 120. Specifically, when the LCD panel 120 is pressed toward the cover body 110, the hooks 112 of the cover body 110 are engaged with a peripheral edge of the LCD panel 120 to assist in positioning the LCD panel 120. Then, the thermal welding pins 111 of the cover body 110 are welded to the extended fastening portions 121 of the LCD panel 120 using a thermal welding method. For example, as shown in FIG. 5, the cover body 110 containing the LCD panel 120 is first placed on a bottom base 210 of a thermal welding press fixture 200, and a top base 220 of the thermal welding press fixture 200 is then pressed toward the LCD panel 120 and cover body 110. Here, multiple thermal welding pins 221 of the top base 220 respectively abut the thermal welding pins 111 of the cover body 110 and apply a pressurization and heating operation on the welding pins 111 for a specific time interval (e.g. 3 to 5 seconds). The thermal welding pins 111 of the cover body 110 are then welded to the extended fastening portions 121 of the LCD panel 120. At this point, assembly between the LCD panel 120 and the cover body 110 is complete.

It is noted that the welding pins 111 of this embodiment are provided with a cross shape. Specifically, the welding pins 111 with the cross shape can easily pass through the fastening through holes 122. After being subjected to pressurization and heating of the thermal welding pins 221, the welding pins 111 are slightly softened. Therefore, gaps existing in the cross of each welding pin 111 provide reshaping spaces for filling of the thermal welding pins 221 and each welding pin 111 is effectively welded to the extended fastening portions 121 after each welding pin 111 is cooled down and solidified. Specifically, the welding pins 111 are not limited to having the cross shape. Namely, the welding pins 111 may have other shapes with the gaps capable of providing the reshaping spaces.

Figure 6:
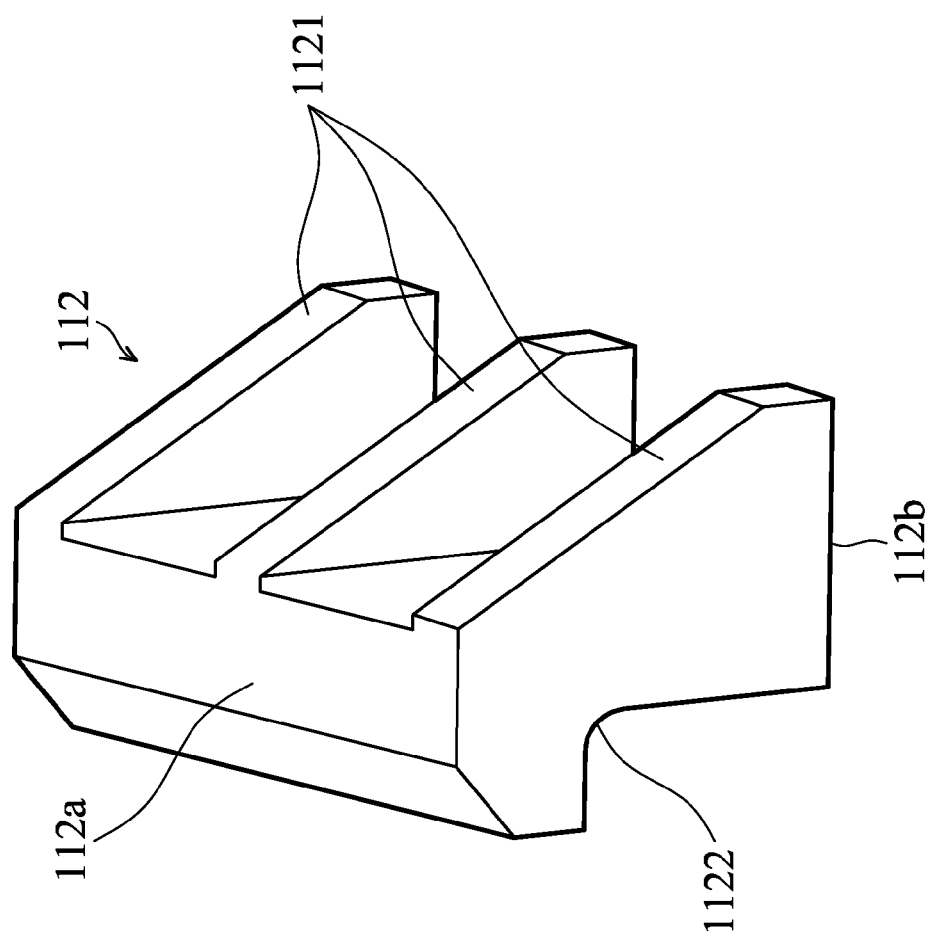
FIG. 6 is a schematic perspective view of a hook of the display of the invention.

Moreover, compared to conventional hooks, the hooks 112 of the cover body 110 of this embodiment may have some enhanced effects. As shown in FIG. 6, each hook 112 comprises at least three (or more) reinforcement ribs 1121 and a curved abutting surface 1122. The reinforcement ribs 1121 respectively extend from a top surface 112*a* of the hook 112 to a bottom surface 112*b* thereof. Specifically, the curved abutting surface 1122 is located on one side with the top surface 112*a* and bottom surface 112*b*, and the reinforcement ribs 1121 are located on the other side with the top surface 112*a* and bottom surface 112*b*. Here, when each hook 112 is engaged with the LCD panel 120, the curved abutting surface 1122 of each hook 112 abuts the peripheral edge of the LCD panel 120.

Accordingly, as each hook 112 comprises at least three reinforcement ribs 1121, overall structural strength of each hook 112 is enhanced, such that each hook 112 is not easily broken. Moreover, as the curved abutting surface 1122 can eliminate possible concentration stress, the overall structural strength of each hook 112 is further enhanced.

In conclusion, as the disclosed display can be easily assembled and provide reduced labor hours for assembly, mass production thereof can be easily accomplished.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display, comprising:
   a cover body comprising at least one thermal welding pin; and
   a liquid-crystal display panel disposed on the cover body and comprising at least one fastening through hole, wherein the thermal welding pin of the cover body is fit in the fastening through hole of the liquid-crystal display panel and is heating welded to the liquid-crystal display panel,
   wherein the cover body further comprises at least one hook engaged with the liquid-crystal display panel, and
   wherein the hook further comprises a curved abutting surface abutting the liquid-crystal display panel.

2. The display as claimed in claim 1, wherein the liquid-crystal display panel further comprises at least one extended fastening portion on which the fastening through hole is formed.

3. The display as claimed in claim 2, wherein the extended fastening portion comprises metal.

4. The display as claimed in claim 1, wherein the hook comprises at least three reinforcement ribs extending from a top surface of the hook to a bottom surface thereof.

5. The display as claimed in claim 1, wherein the curved abutting surface of the hook is located on one side with the top and bottom surfaces and the reinforcement ribs are located on the other side with the top and bottom surfaces.

6. The display as claimed in claim 5, wherein the thermal welding pin is integrally formed with the cover body.

7. The display as claimed in claim 6, wherein the hook is integrally formed with the cover body.

8. The display as claimed in claim 7, wherein the thermal welding pin is provided with a cross shape.

\* \* \* \* \*